United States Patent
Bund

(10) Patent No.: US 10,536,618 B2
(45) Date of Patent: Jan. 14, 2020

(54) FILL LIGHTING APPARATUS

(71) Applicant: Nokia Technologies Oy, Espoo (FI)

(72) Inventor: Geoffrey Bund, Los Angeles, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/844,851

(22) Filed: Dec. 18, 2017

(65) Prior Publication Data

US 2018/0176432 A1    Jun. 21, 2018

(30) Foreign Application Priority Data

Dec. 20, 2016 (EP) .................................. 16205198

(51) Int. Cl.
    *H05B 37/02* (2006.01)
    *H04N 5/225* (2006.01)

(52) U.S. Cl.
    CPC ......... *H04N 5/2256* (2013.01); *H04N 5/2254* (2013.01)

(58) Field of Classification Search
    CPC ............... H04N 5/2254; H04N 5/2256; H05B 37/0227; H05B 37/0272; H05B 37/036
    USPC ............................................ 315/152, 185 R
    See application file for complete search history.

(56) References Cited

U.S. PATENT DOCUMENTS

| 8,670,029 B2 | 3/2014 | McEldowney | |
|---|---|---|---|
| 9,285,893 B2 | 3/2016 | Holz | |
| 2004/0052076 A1* | 3/2004 | Mueller | F21V 23/0442 362/293 |
| 2004/0149892 A1* | 8/2004 | Akitt | G06F 3/03547 250/221 |
| 2009/0034958 A1* | 2/2009 | Dierenbach | G03B 15/03 396/199 |
| 2012/0206050 A1* | 8/2012 | Spero | B60Q 1/04 315/152 |
| 2013/0039063 A1 | 2/2013 | Quaal et al. | |
| 2014/0152802 A1 | 6/2014 | Olsson et al. | |

(Continued)

FOREIGN PATENT DOCUMENTS

| WO | 2002/044808 A2 | 6/2002 |
|---|---|---|
| WO | 2010/121506 A1 | 10/2010 |

(Continued)

OTHER PUBLICATIONS

"360° C. Panoramic View a New Standard in Capsule Endoscopy", CapsoVision, Retrieved on Dec. 19, 2017, Webpage available at : http://www.rb-cms.nl/classes/FCKeditor/upload/79/File/capsovisio_brochure.pdf.

(Continued)

*Primary Examiner* — Tung X Le
(74) *Attorney, Agent, or Firm* — Alston & Bird LLP

(57) ABSTRACT

An apparatus comprising a length of strip light populated with a plurality of light fixtures, the apparatus configured to be removably attachable to an imaging device; wherein, when the apparatus is attached to the imaging device: the apparatus surrounds the imaging device but does not occlude one or more cameras of the imaging device that are located about the imaging device, such that the apparatus and light emitted by the strip light do not obscure or distort a respective field of view of the one or more cameras; and the plurality of light fixtures of the strip light are controllable to selectively emit light into the environment that surrounds the imaging device.

20 Claims, 10 Drawing Sheets

(56) References Cited

U.S. PATENT DOCUMENTS

| | | | |
|---|---|---|---|
| 2014/0153916 A1 | 6/2014 | Kintner | |
| 2014/0307412 A1* | 10/2014 | Prado | G03B 15/03 362/3 |
| 2015/0115809 A1* | 4/2015 | Siessegger | H05B 33/0803 315/185 R |
| 2015/0181679 A1* | 6/2015 | Liao | H05B 37/0227 315/291 |
| 2016/0230981 A1* | 8/2016 | Shoemake | F21V 33/0052 |
| 2016/0286619 A1* | 9/2016 | Roberts | H05B 33/0854 |
| 2017/0105265 A1* | 4/2017 | Sadwick | A61N 5/0618 |

FOREIGN PATENT DOCUMENTS

| | | |
|---|---|---|
| WO | 2012/158894 A2 | 11/2012 |
| WO | 2014/066405 A1 | 5/2014 |
| WO | 2015/128801 A2 | 9/2015 |
| WO | 2016/055688 A1 | 4/2016 |
| WO | 2016/073980 A1 | 5/2016 |

OTHER PUBLICATIONS

"FE8391-V Fisheye Network Camera", Vivotek, Retrieved on Dec. 19, 2017, Webpage available at : http://www.vivotek.com/fe8391-v/#views:view=jplist-grid-view.

Extended European Search Report received for corresponding European Patent Application No. 16205198.1, dated Mar. 24, 2017, 7 pages.

* cited by examiner

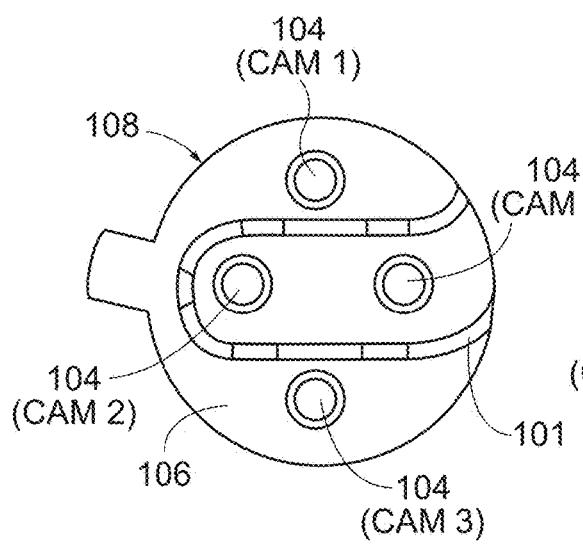
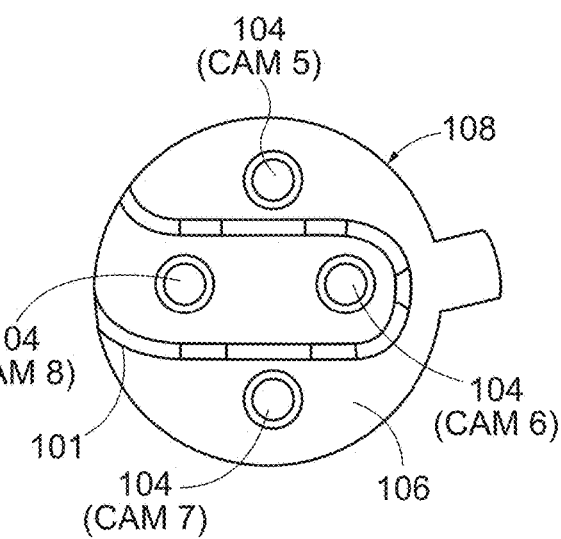
FIG. 1A
FIG. 1B
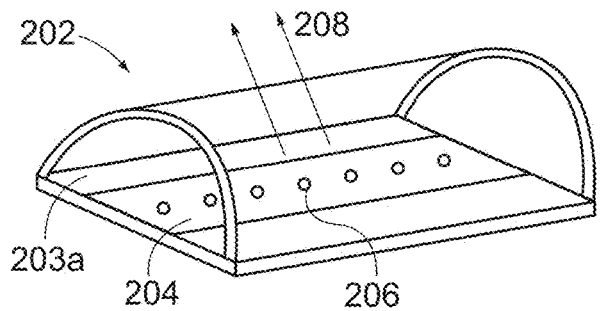
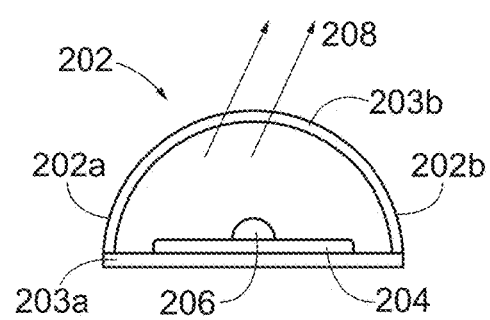
FIG. 2A
FIG. 2B
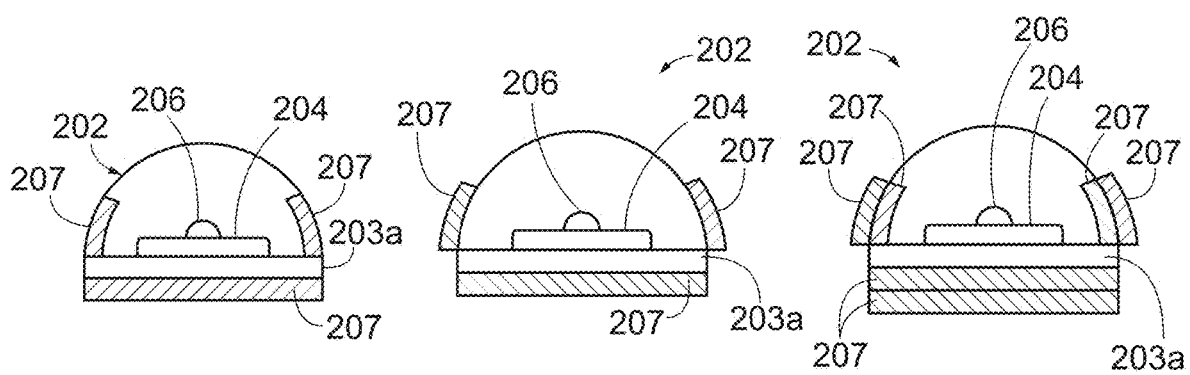
FIG. 2C
FIG. 2D
FIG. 2E

FILL LIGHTING APPARATUS

TECHNOLOGICAL FIELD

Described are examples which relate to a fill lighting apparatus for use with an imaging device such as a wide angle imaging device.

BACKGROUND

It can be useful to provide a fill lighting effect into an environment when capturing still photographs or video footage. For example, fill lighting equipment may be used to provide flash, or steady fill lighting (or a combination of the two) to illuminate a subject being captured from one or more different directions. A fill light may be part of an imaging device itself, an accessory attached to the imaging device, or dedicated lighting equipment used in co-operation with, but distally located of, the imaging device. The dedicated lighting equipment may be freestanding, mountable on a supporting apparatus (e.g. tripod or lighting rig) or handheld.

SUMMARY

According to various, but not necessarily all, embodiments of the invention there is provided an apparatus comprising a length of strip light populated with a plurality of light fixtures, the apparatus configured to be removably attachable to an imaging device; wherein, when the apparatus is attached to the imaging device: the apparatus surrounds the imaging device but does not occlude one or more cameras of the imaging device that are located about the imaging device, such that the apparatus and light emitted by the strip light do not obscure or distort a respective field of view of the one or more cameras; and the plurality of light fixtures of the strip light are controllable to selectively emit light into the environment that surrounds the imaging device.

In some examples, the strip light is housed within a flexible structure.

In some examples, the structure is reversibly deformable in response to the application of a stress force.

In some examples, the apparatus further comprises a backing surface, wherein when the apparatus is attached to the imaging device, at least part of the backing surface is configured to grip an external surface of the imaging device.

In some examples, the backing surface is shaped to support the flexible structure.

In some examples, the backing material is further shaped to have a series of heat sink cooling fins configured to draw excess heat away from one or both of the apparatus and the imaging device.

In some examples, the backing surface is made of metal, preferably aluminium.

In some examples, the strip light is a flexible Light Emitting Diode (LED) strip light comprising a plurality of LED light fixtures.

In some examples, the plurality of LED light fixtures comprises one or more colour changing LEDs.

In some examples, the plurality of light fixtures of the strip light are controllable by a control system comprising a control module, to set or adjust one or more attributes of the light emitted by the strip light.

In some examples, the one or more attributes of the light emitted by the strip light comprise any one or more of: luminance, and one or more colour characteristics.

In some examples, the control module is a Digital Multiplex (DMX) controller and the control system further comprises a DMX decoder-driver unit configured to communicate with the DMX controller; wherein the strip light is connected to an output of the DMX decoder-driver unit so that the plurality of light fixtures are individually addressable and controllable to set or adjust the one or more attributes of the light emitted by the strip light.

In some examples, the strip light comprises one or more separate lengths of strip light; wherein each respective separate length of strip light is individually controllable by the DMX controller and a respective DMX decoder-driver unit.

In some examples, the light fixtures of the strip light are controllable according to two or more discrete segments of the light fixtures.

In some examples, the plurality of light fixtures of the strip light are controllable by the control module over a period of time, to set or adjust the one or more attributes of the light emitted by the strip light according to one or more of: a user-defined pre-programmed sequence, and a computer generated sequence.

In some examples, the apparatus is configured to be removably attachable to an imaging device that is capable of 360 degree image capture.

Further features and advantages of the invention will become apparent from the following description of preferred embodiments of the invention, given by way of example only, which is made with reference to the accompanying drawings.

BRIEF DESCRIPTION OF DRAWINGS

For a better understanding of various examples that are useful for understanding the detailed description, reference will now be made by way of example only to the accompanying drawings in which:

FIGS. 1a and 1b show an example embodiment of a lighting apparatus attached to an imaging device.

FIGS. 2a-2e show example embodiments of a structure of the lighting apparatus.

DETAILED DESCRIPTION

Imaging Device

Figure 3A:
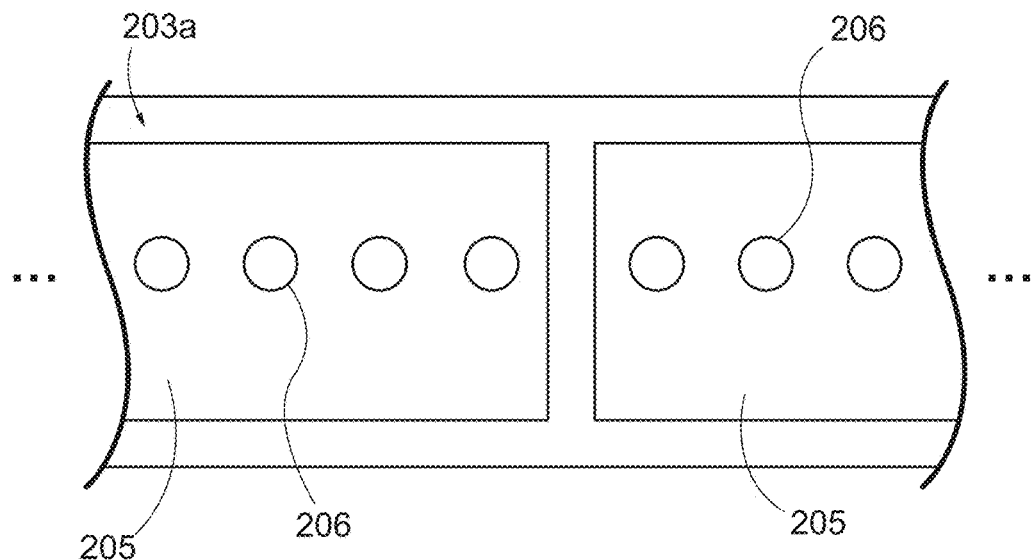
FIG. 3a-3c show example embodiments of a strip light of the lighting apparatus.

FIGS. 1a and 1b show left and right side perspective views of a lighting apparatus 101 according to one embodiment of the present invention. The lighting apparatus 101 is shown attached to an external housing 106 of an imaging device 108. As explained in more detail below, the imaging device 108 described throughout is capable of 360 degree image capture for still images and/or video images.

The imaging device 108 may be a Nokia OZO™, commercially available from Nokia Technologies, Oy. The imaging device 108 may have the capability to capture spherical images, i.e. images from all directions around the imaging device 108. The imaging device comprises multiple (for example, eight) cameras 104 (CAM1, CAM2, CAMN) with overlapping field of view so that regions of the view around the imaging device 108 is captured from at least two cameras to provide stereo imaging. For example, eight cameras having wide-angle lenses may be arranged regularly at the corners of a virtual cube and covering the whole sphere such that essentially the whole sphere is covered at all directions. The imaging device 108 shown is roughly spherical, but other shapes and designs of imaging device 108 are possible.

It should be understood that although an eight-camera-cubical configuration is described herein for the purpose of this application, other camera configurations are possible. For example, alternative configurations may comprise a different arrangement of the cameras about the imaging device 108 and/or more or fewer cameras. The cameras may be regularly or irregularly spaced across the whole sphere of view, or they may cover only part of the whole sphere, for example a hemisphere. As a further example, the imaging device 108 may comprise as few as two opposing cameras, each with a field of view of 180-degrees or wider. With this configuration, the imaging device 108 has the capability to capture 360 degree images but around one viewing plane, rather than fully spherical images. We refer to published patent application WO2016055688 which is incorporated herein by reference and which describes various other camera configurations.

Apparatus Structure

As shown in FIGS. 1*a* and 1*b*, the lighting apparatus 101 may be one substantially continuous length that is removably attachable to an external surface or housing of the imaging device 108. As shown in FIGS. 2*a* and 2*b*, the continuous length may be a, flexible structure 202 which houses a light means 204. The continuous length may be circuitous so that it forms a complete loop. Alternatively the continuous length may have separate and defined start and end points. The structure may 202 be made from a firm but flexible material such as silicon, silicone, rubber, PVC and the like, or a combination of one or more of these materials. The flexible structure 202 may also have elastic properties so that it can be reversibly deformed in size and shape in response to the application and removal of a stress force. In the present example, the shape of the structure 202 is shown as substantially semi-circular in cross-section, with a flat underside floor surface 203*a*, side walls 202*a* and 202*b*. It should be understood that other cross-sectional shapes may be used for the structure 202.

In one example, the structure 202 is a tubular structure which has a transparent topside roof surface 203*b* that functions to protect the light means 204 from the environment but without significantly interfering with the level of light that is emitted into the scene to be captured by the imaging device 108. For instance, the side walls 202*a*, 202*b* and topside roof surface 203*b* may surround the lighting means 204 so that the lighting means 204 is weather-proofed (or weather resistant), preventing dust, moisture, dirt, debris and the like from affecting the performance of the lighting means 204. The light means 204 may also be water resistant or fully water-proof e.g. so that the lighting apparatus 101 may be used underwater. In alternative embodiments (not shown here), the topside roof surface 203*b* and optionally one or both side walls 202*a* and 202*b* may be absent. In this embodiment the light means 204 may simply be located on top of the underside floor section 203*a* and left exposed to the environment.

The tubular structure 202 is at least partially transparent so that light 208 generated by the light means 204 can pass through at least the topside roof surface 203*b* with minimal impedance, in order to illuminate the scene to be captured by the imaging device 108. The entire tubular structure 202 may be substantially transparent. In alternative embodiments, rather than a tubular structure, the material of the structure 202 is solid and surrounds the lighting means 204. For example a transparent silicon, silicone, rubber, PVC and the like, or a combination of one or more of these materials may be cast directly over and around the lighting means 204.

In embodiments, one or more portions of the structure 202 may be substantially opaque 207 so that light cannot pass through these portions. It may be useful for the side walls 202*a*, 202*b* and the underside floor surface 203*a* to be opaque as these are the parts of the structure 202 that are in closest proximity to the imaging device 108, when the structure 202 is attached thereto. This will help to direct the light 208 outwards towards the scene to be captured, rather than back towards the surface of the imaging device 108 where light is generally not needed. Reducing the amount of light at the surface of the imaging device 108 helps to mitigate unwanted reflections, flare and other light-based distortions that may otherwise be picked up by the cameras 104 of the imaging device 108.

The opacity of the structure 202 may be implemented in a number of different ways. For example, the transparent and opaque portions may be a property of the structure 202 itself i.e. the structure 202 is made of one or more materials of varying transparency. Alternatively or in addition, as shown in FIGS. 2*c*, 2*d* and 2*e* respectively, the opaque portions 207 of the structure 202 may be achieved by an opaque cover or lining material. Such a cover or lining may be fixed inside the structure 202 (see FIG. 2*c*); fixed to the outside of the structure (see FIG. 2*d*), or both (see FIG. 2*e*). In any of these example embodiments, some parts of the opaque material 207 and/or a reflective lining material (not shown) may also act to directionally reflect light so as to maximize the amount of light that is directed outwards to the scene to be captured by the imaging device 108. The reflective material may also act to reflect excess heat, generated by imaging device 108 and/or the light means 204, away from both of these respective devices. The rest of the lighting apparatus may be designed to have a substantially matte finish in order to further mitigate unwanted reflections, flare and/or other light-based distortions.

Light Means

Figure 3B:
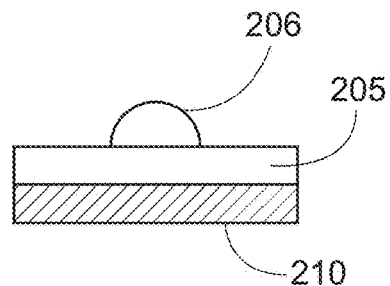

As shown in FIGS. 3*a* and 3*b*, the light means 204 may comprise one or more flexible strip lights 205, each comprising a plurality of individual light fixtures 206 mounted on a flexible PCB (0 board). The strip light 205 has a backing surface 210 on the underside of the PCB circuit so that it may be adhered to part of the structure e.g. the top of the underside floor surface 203*a*. Alternatively, the strip light 205 may be integrally formed as part of the lighting apparatus 101. In this case, a dedicated backing surface 210 may not be required to adhere the strip light 205 to the flexible structure 202.

Alternatively or in addition, strips lights 205 may be fixed along one or both the side walls 202*a* and 20*b*. The strip lights 205 may be one continuous strip that runs the length of the structure 202, or may be formed of a plurality of smaller strips positioned in series along the length of the structure. The strip lights 205 are suitably flexible to follow the bends and contours of the part of the tube structure 202 that the backing surface 210 is adhered to. For example, the strip light 205 may curve and bend at an angle of up to 90 degrees.

Figure 3C:
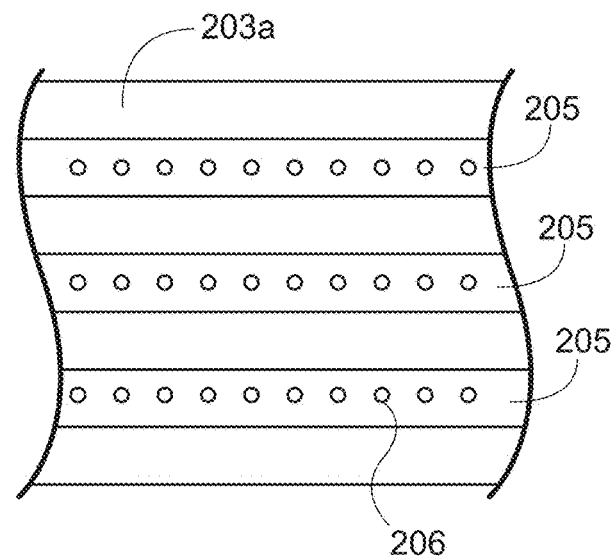
Figure 4A:
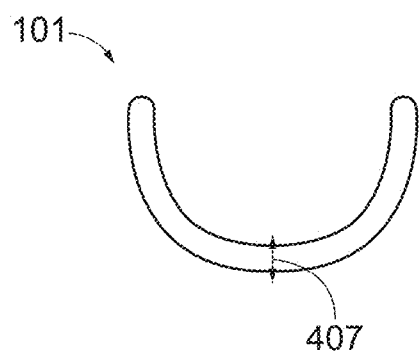
FIG. 4a-4d show an example embodiment of the size and shape of the lighting apparatus.
Figure 4B:
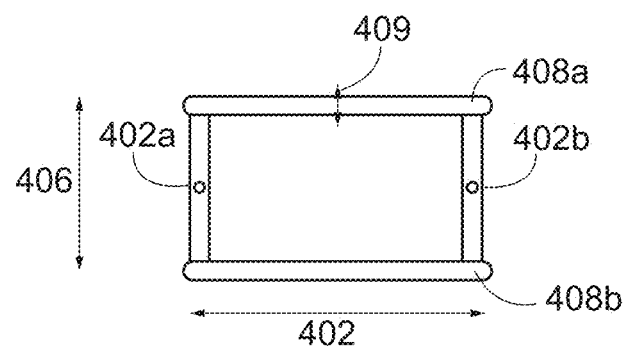
Figure 4C:
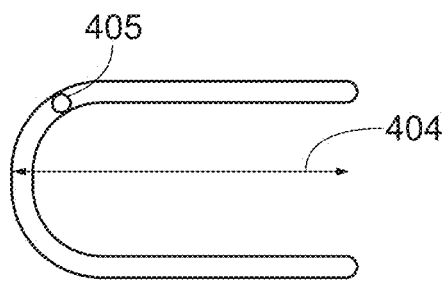
Figure 4D:
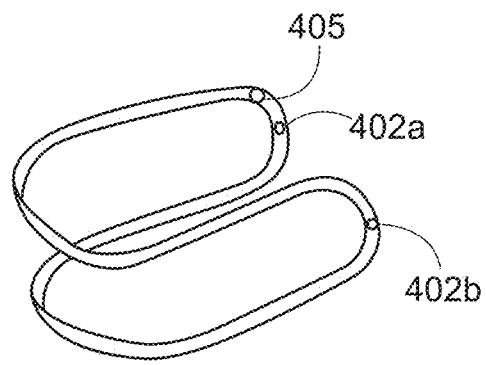

In embodiments, multiple strip lights 205 may be positioned in parallel with one another along a particular part of the structure 202 e.g. as shown in FIG. 3c, two or more rows of strip lights 205 may be laid side-by-side along the underside floor surface 203a.

Light Emitting Diodes (LEDs)

The strip light 205 may be a flexible LED (light emitting diode) strip light 205 which is compact in size and capable of a high level of luminosity while maintaining low level power consumption. LED strip lights are also known as LED tape lights or LED ribbon lights.

As is well-known in the art, LED strip lights 205 can be manufactured to have different lighting effect attributes. Some examples are that each individual LED on a strip may be configured to emit the same colour light; each individual LED may be configured to emit its own, single colour, which may be the same or different to any number of other LEDs on the same strip; each LED fixture 206 may comprise three sub-LED elements—RGB (red, green, blue) which form a colour changing LED so that the LEDs can be programmed to emit light of almost any colour. Such RGB colour changing LEDs can combine the RGB colours of light to emit any of over 16 million hues of light (including white light by combining equal amounts of RGB light). Each RGB LED can also be programmed to vary the colour of light it emits over time. For convenience we refer only to RGB colour changing LEDs hereinafter, although other types of colour changing LEDs are available, e.g. RGBW LEDs, where each LED fixture 206 consists of red, green, blue and white sub-LEDs. In alternative embodiments, the colours of the sub-LED elements may be a combination other than RGB (or RGBW). For convenience we refer to LED strip lights 205 hereinafter, although other lighting means 204 may be used instead.

Printed Circuit Board (PCB) and Power Supply

The PCB of an LED strip light 205 is connected to a suitable power supply (not shown) so that the LEDs can be powered. The voltage level required will be dependent on the type of LED strip light, the length of the strip and any optional dimming and/or colour control of the LEDs as required. Typically, for a length of LED strip light 205 in the range of 500-10000 mm and that is long enough to extend around an imaging device 108 of the kinds described above, a 12 Volt DC power supply would be suitable. A suitable AC-DC power adapter may be provided so that the lighting apparatus 101 may be powered from a mains power supply e.g. 220-230V AC, 50 Hz (Europe), 110-120V AC, 60 Hz (North America), and so on. The power adapter should have a power rating that is at least 20% above the Watts per metre rating of the strip light when multiplied by the length of strip light used e.g. 1 metre of 9.6 W/m$^{-1}$ strip light 205 should use a 12 W power adapter. Other value ratings of strip light may be paired with an appropriately rated power supply. For example, 3 W, 4.5 W, 7.2 W, 8 W and 14.4 W are just some examples of commonly used power consumption ratings for LED strip lights.

Alternatively, the power supply for the LED strip light 205 may be tapped from the imaging device 108 that the lighting apparatus 101 is attachable to. For example, a suitable power cable and optionally a power adapter may be provided so that the lighting apparatus 101 may connect to a power output of the imaging device 108. The lighting apparatus can then draw the required current and voltage directly from the imaging device 108.

As another alternative, a battery pack comprising one or more batteries could be used to provide the current and voltage required to power the lighting apparatus 101. This may be useful if the lighting apparatus 101 and imaging device 108 are to be used on location or where a mains power supply is not available. The batteries may be rechargeable lithium (Li) 12V batteries. Preferably, the battery pack at least matches the performance of the imaging device 108. For example, if the imaging device 108 is able to operate for a maximum duration of fifty minutes when powered by a battery pack, then a battery pack that powers the lighting apparatus 101 should hold sufficient charge to power the lighting apparatus 101 for at least fifty minutes of operation. In one example embodiment, the lighting apparatus 101 and the imaging device 108 may be powered by the same battery pack. As explained in more detail below, a control system 700 comprising a controller 211 may be configured to set and adjust various lighting effects of the strip light 205. The lighting effects may include one or more of luminance (intensity, brightness or darkness), colour characteristic(s), and a timer sequence of the LED strip light 205.

Lighting Apparatus Shape and Dimensions

FIGS. 4a, 4b, 4c and 4d show one example of the lighting apparatus 101 from a plan, front, left side and perspective view, respectively. As shown in FIG. 4 the structure 202 is configured to have what is described herein as an elliptical semi-circle shape, which is configured to fit around the external surface of an imaging device 108. In this example, the lighting apparatus 101 is shaped for use with the Nokia OZO imaging device 108, which has a substantially spherical external body. FIG. 4 shows the lighting apparatus 101 only; that is before or after being attached to the imaging device 108, which is not shown in FIG. 4. The lighting apparatus may have one or more connection ports 405 for connecting the lighting apparatus to the power supply and/or to a control system 700 (as described below). For example, a power input port could be configured to accept any suitable DC connector such as cylindrical (barrel), snap and lock, Molex, USB, XLR and the like. An input port for connecting the lighting apparatus 101 to a control system 700 could for example accommodate a typical 4-pin RGB (and voltage line) connector. While the connection port 405 is depicted at the top-left rear section of the lighting apparatus 101, it should be understood that the one or more connection ports 405 may be located elsewhere on the lighting apparatus 101.

In this example, the lighting apparatus 101 may have the following dimensions: 175 mm long (that is, the horizontal separation distance 402 defined by the two extremities, 402a and 402b, of the curved ends of the ellipse shape); 140 mm wide (that is, the distance 404, how far back the curved apparatus extends from a front side 404); and 100 mm high (that is, the maximum vertical separation distance 406 between the top 408a and bottom 408b sides of the of the ellipse shape). The profile (or depth) 407 of the lighting apparatus 101 may be uniform or may vary along the length of the lighting apparatus 101. The profile of a typical LED strip light 205 is 2 mm, and so the profile 407 of the lighting apparatus 101 may be kept within 5 mm-10 mm along the full length of the lighting apparatus 101. The thickness 409 of the lighting apparatus 101 may also be uniform or vary along the length of the lighting apparatus 101. For example, the lighting apparatus 101 may have a thickness 409 in the range of 10 mm-50 mm, depending on the thickness of the strip light 205 (or other light means 204) it houses.

However, it should be understood that these dimensions are given as one example; the overall size and/or shape of the lighting apparatus 101 may take many other forms so that it can co-operate with other models of imaging devices 108. The flexible properties of the structure 202 and strip light 205 also means that the lighting apparatus 101 may be shaped and retrofitted to a number of different models of imaging devices 108, without impacting on the field of view of the one or more cameras 104 of those imaging devices 108.

Further still, the lighting apparatus 101 may be provided in modular form. That is, the lighting apparatus 101 may be provided as two or more discrete parts which are each controllable and removably attachable to the imaging device 108 in any of the ways described herein.

In some embodiments the size and/or shape of the lighting apparatus is customisable. A user may cut the lighting apparatus 101 to a desired length (or multiple lengths if in modular form). The one or more lengths of the lighting apparatus 101 can then be flexed and shaped as needed before being attached to the imaging device 108 in any of the ways described herein. One end of the strip light 205 has terminals which are connectable to a controller 211 or DMX decoder-driver 212 of the control system 700 (described in detail below). A terminal connector may optionally be fixed to the other end of the strip light 205.

Mounting of Lighting Apparatus

The lighting apparatus 101 is configured to be removably attachable to the imaging device 108. In one embodiment, the size, shape and flexibility of the structure 202 of the lighting apparatus 101 enable the lighting apparatus 101 to be securely mounted to the imaging device 108 without any further means for attachment.

Taking the example of the Nokia OZO as the imaging device 108, the structure 202 may have "an interference fit" when mounted on the imaging device 108. The dimensions described above in relation to FIG. 4 describe the lighting apparatus 101 before or after being attached to the imaging device 108. To mount the lighting apparatus 101 onto the imaging device 108, a user may apply a stress force to flex the structure 202 slightly and deform its size and shape over its given dimensions. The user can then align the lighting apparatus over the imaging device 108. Once aligned, the user releases the now-mounted lighting apparatus 101, thus removing the applied force such that the flexible structure 202 will attempt to return to its original size and shape under its own elasticity. The structure 202 therefore grips the external surface 106 of the imaging device 108, with the rear side of the floor surface 203a of the structure 202 laying face-to-face, in contact with the external surface of the imaging device 108. The lighting apparatus 101 is thus securely attached to the imaging device 108 having an "interference fit" and is ready for operation.

Figure 5A:
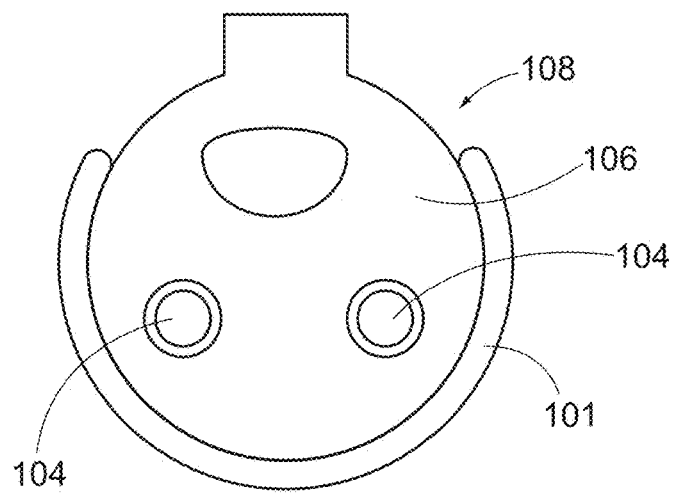
FIGS. 5a and 5b show example embodiments of how the lighting apparatus may be attached to the imaging device.
Figure 5B:
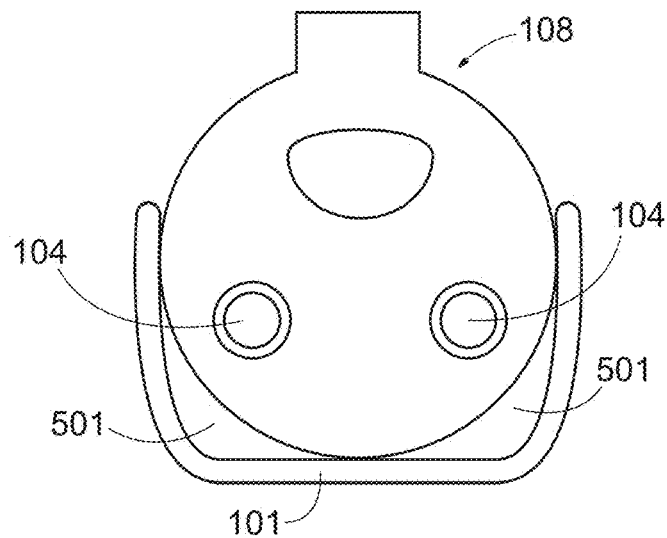

FIGS. 5a and 5b show a plan view of two different embodiments for when the lighting apparatus 101 is attached to the imaging device 108. In the embodiment shown in FIG. 5a, substantially the whole length of the lighting apparatus 101 may be in contact with the external surface 106 of the imaging device 108. In the embodiment shown in FIG. 5b, only some parts of the lighting apparatus 101 may be configured to be in contact with the external surface 106 of the imaging device 108 so that one or more air gaps 501 may be formed between the lighting apparatus 101 and the external surface 106 of the imaging device 108.

When a user wants to remove the lighting apparatus 101 from the imaging device 108, a reverse process is applied. More specifically, a user can apply a slight stress force to the attached structure 202 so that the lighting apparatus 101 can then be moved away from the imaging device 108. When the user releases the stress force they applied in order to remove the lighting apparatus 101, the structure 202 will return to its original size and shape under its own elastic properties (as was shown in FIG. 4).

In alternative embodiments, the lighting apparatus 101 may be provided with dedicated attachment means for securing it to the imaging device 108. The attachment means may take the form of any one or more of: adhesive applied to the rear side of the floor surface 203a, vacuum suction pads applied to the rear side of the floor surface 203a, one or more clamping devices fixed to the rear side of the floor surface 203 and/or the side walls 202a and 202b. Alternatively any of the attachment means may be provided solely on the imaging device 108 so that the lighting apparatus 101 can be removably attached thereto. Further, or in addition, the attachment means may be provided on both the lighting apparatus 101 and the imaging device 108 so that the two pieces of apparatus co-operate. For example, in this scenario, the attachment means may comprise any one or more of screw and screw-hole combination, but and bolt combination, co-one or more co-operating Velcro® pads, one or more co-operating portions of magnetic metal, tongue-and-groove joint, tongue-in-groove joint, or any other suitable co-operating attachment means that enables the lighting apparatus 101 to be removably attached to the imaging device 108.

Lighting Apparatus Backing Surface

Figure 6:
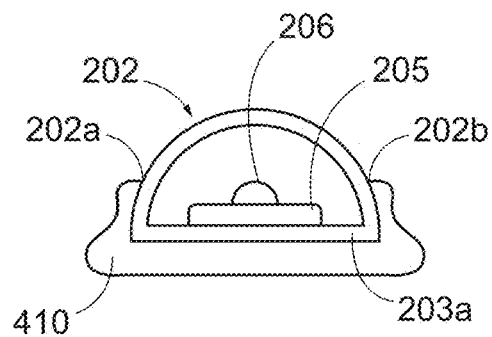
FIG. 6 shows an example embodiment of a backing surface material configured to support the structure and to attach the lighting apparatus to the imaging device.

In one example embodiment, the lighting apparatus 101 further comprises a backing surface (or extrusion) 410, as shown in cross section in FIG. 6. In embodiments the backing surface 410 is configured to support the rear side of the of the floor surface 203a of the structure 202. The lighting apparatus 101 with backing surface 410 is further configured to be removably attachable onto the imaging device 108 in a similar to any of the ways as described above. That is, some or all of the backing surface 410 may be configured to grip or otherwise engage with the external surface of the imaging device 108, as an alternative or in addition to the rear side of the floor surface 203a of the structure 202.

In one embodiment, the backing surface 410 may comprise one or more discrete portions that are removably attachable to the rear side of the of the floor surface 203a of the structure 202. The discrete portions may extend along substantially the entire length of the structure 202. In an alternative embodiment, the backing surface 410 may comprise a one or more discrete portions of the backing surface 410 located along only one or more certain parts of the length of the structure 202. In a still further embodiment, rather than being a separate element that supports the structure 202, the backing surface 410 may be integrally formed as part of the structure 202 itself.

The backing surface 410 may be made from, or comprise, a material that advantageously acts as a thermal heat sink to vent excess heat away from the imaging device 108. For example, the backing surface material may comprise one or more metallic materials that can effectively conduct heat away from the imaging device 108 e.g. aluminium, steel, copper or some other suitable metal. The metallic backing material may also act as a thermal heat sink for conducting away heat that is generated by the LED strip light 205 of the lighting apparatus 101.

The backing surface 410 may be shaped in order to vent excess heat away from the imaging device 108 and/or the lighting apparatus 101. For example heat sink fins provide an increased surface area to more efficiently conduct heat away from the imaging device 108 and/or the lighting apparatus 101. Also, a curved profile shape further aids in channeling heat convection away from the imaging device 108.

Optionally, the backing surface 410 may also extend around the structure 202 so that it supports at least a portion of one or both of the side walls 202a and 202b. The top roof surface 203b, or the exposed strip light 205 (in embodiments where the strip light 205 is not encased by the structure 202), remains uncovered so that the strip light 205 is able to emit light 208 into the scene to be captured by the imaging device 108.

In embodiments the backing surface 410 has a matte finish in order to minimise reflections Controller and Controlling the Lighting Apparatus Referring to FIGS. 7a-7e, details of the control system 700 will now be described. In the following, the example of the LED strip light 205 is used, although it should be understood that other lighting means 204 may be used instead.

Figure 7A:
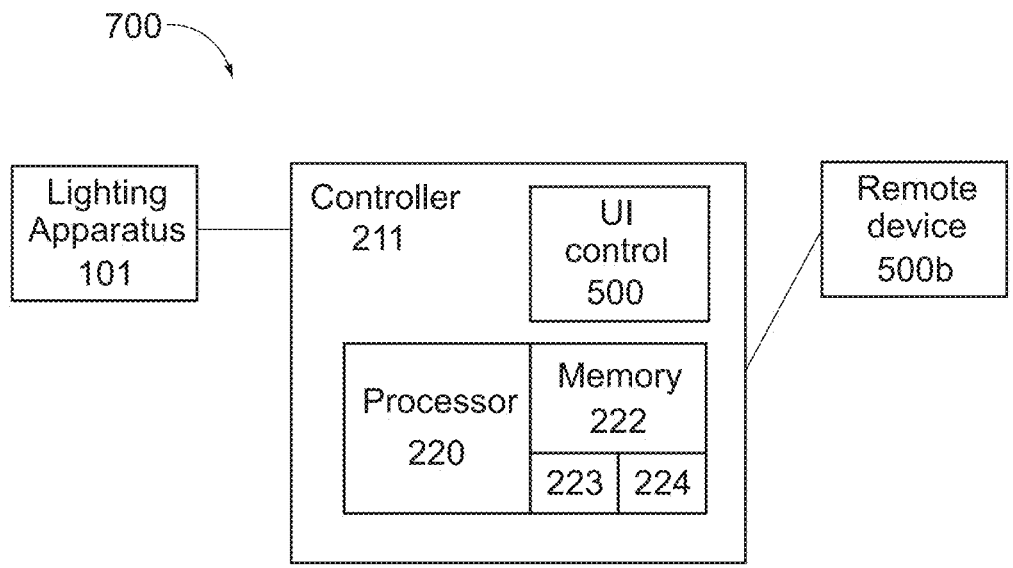
FIGS. 7a-7e show example embodiments of a control system for controlling one of more lighting effects of the lighting apparatus.

As shown in FIG. 7a A controller 211 may be a control module that is an integral part of the lighting apparatus 101 that sends control signals along the strip light 205 PCB so that all of LEDs which populate the strip light 205 can be controlled. Alternatively, the controller 211 may be a dedicated control module that is separate from but configured to interface with the lighting apparatus 101. In either case, the controller 211 may further comprise a processor 200 and a memory store 222 as described in more detail below. The controller may be controlled by a user who interacts with a user interface control 500. The user interface control 500 may be in the form of a user interface located on the lighting apparatus 101 itself and/or on the dedicated separate control module 211. For example, the user interface control 500 may comprise one or more of any of: a display, a touch screen display, physical buttons, switches, sliders, rotary dials, voice recognition control and the like.

Alternatively, or in addition, the user interface control 500 may be a remote device 500b that is able to remotely communicate with the controller 211. For example the remote device 500b may be any one or more of: a dedicated user interface control, similar to that described above, an existing computing device such as a desktop computer, laptop, mobile phone, tablet, phablet, PDA, pager, and any other suitable electronic device. The remote device 500b may be configured to communicate with the controller 211 by any suitable means including wired connection (e.g. USB, Ethernet), wireless network connection (for example: WLAN: Wi-Fi (IEEE 802.11), HiperLAN; WPAN: Bluetooth, Infra-Red, NFC; WAN: cellular 2G, 2.5G, 3G, 4G, 5G standards, etc.).

In embodiments where all of the LED fixtures 206 that make up a single strip light 205 are to be controlled in a uniform manner, the controller 211 may interface directly with lighting apparatus 101, without any intermediate apparatus required. In this embodiment all of the LED fixtures 206 on a section of strip light 205 will receive the same lighting control signals. Therefore taking the example of a single strip light 205 populated with RGB colour changing LED fixtures 206, the one or more controlled lighting effects of luminance (intensity, brightness or darkness), colour characteristic(s), and timer sequence, will appear the same across the full length of the lighting apparatus 101. As one example, the LED fixtures 206 may be controlled to emit light that has a uniform luminosity of 700 lumens, has a magenta hue (a mixture of red and blue light), and that remains on constantly over a period of time (steady output).

Digital Multiplex Signal (DMX Signal) Control

Figure 7B:
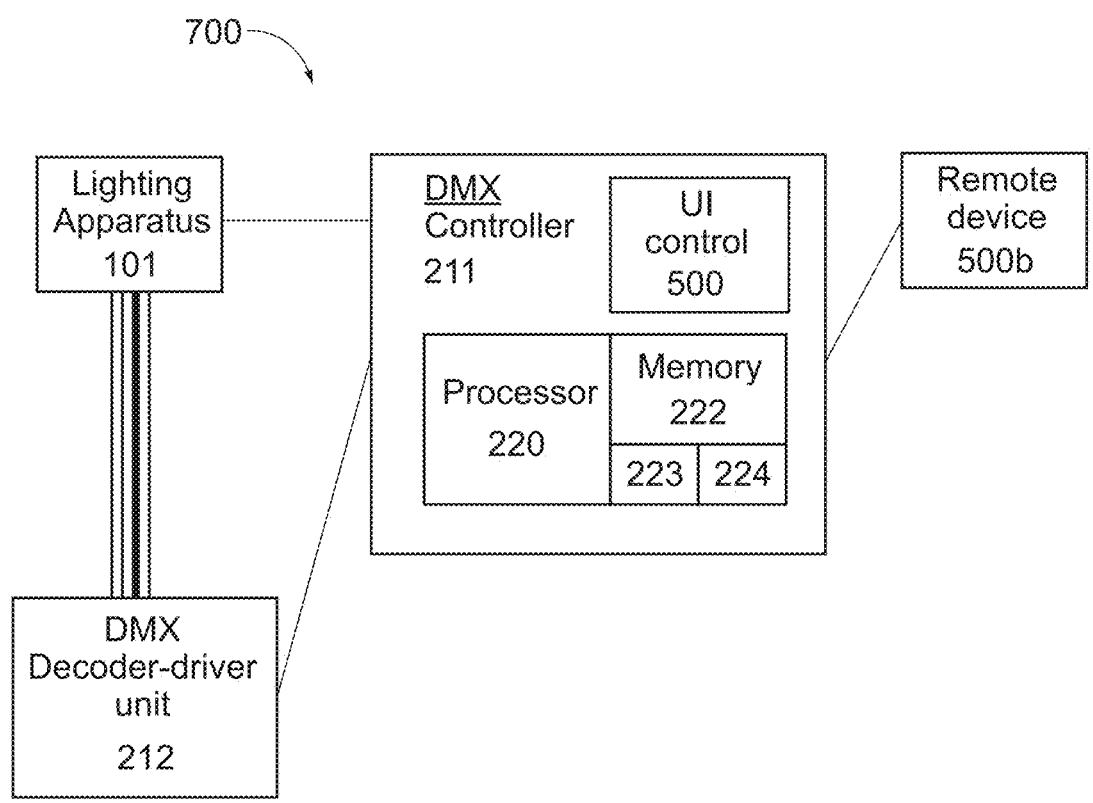

Referring to FIG. 7b, more dynamic lighting effects can be realised if the plurality of LEDs are individually addressable and controllable. This is possible when the controller 211 is a Digital Multiplex Signal "DMX" controller. The DMX controller 211 interfaces with an intermediate DMX decoder-driver unit 212. The DMX decoder-driver unit 212 in turn also interfaces with the lighting apparatus 101 to provide the control signals to the strip light 205 PCB. The DMX decoder-driver unit 212 may be connected to the lighting apparatus 101 by way of a typical 4-pin RGB (and voltage line) connector, represented by four lines in FIGS. 7b-7e.

A typical DMX controller 211 can control up to 512 channels. Therefore, in the case of a strip light 205 comprising only single colour LEDs, the DMX controller 211 can provide control to up to 512 LED fixtures 206. In this case, the DMX controller 211 may use a single channel DMX decoder-driver unit 212. Other DMX controllers are available which can control 1024, 2048, or more channels, for example if the strip light comprises more than 512 and/or each LED fixture 206 requires a plurality of channels. For convenience, the DMX controller 211 referred to herein is considered to be a 512 channel DMX controller 211.

In example embodiments where the strip light 205 comprises RGB colour changing LEDs, each LED fixture 206 requires three channels, and so the 512 channel DMX controller 211 can provide individual control to up to 170 LED fixtures 206. Because the DMX controller 211 needs three channels in order to control all three colours, a three-channel DMX decoder-driver unit 212 is also required. Similarly, if RGBW LEDs are being used, then a four-channel decoder (driver) unit will be required for providing induvial control to up to 128 LED fixtures 206, and so on.

Figure 7C:
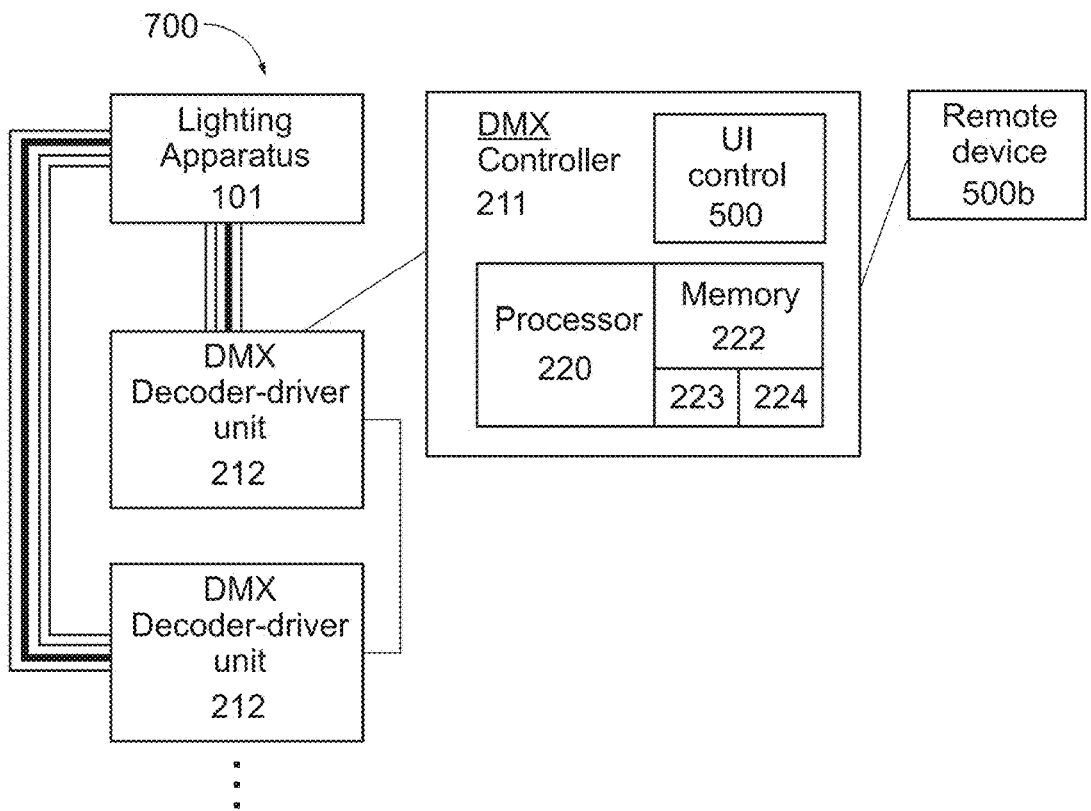
Figure 7D:
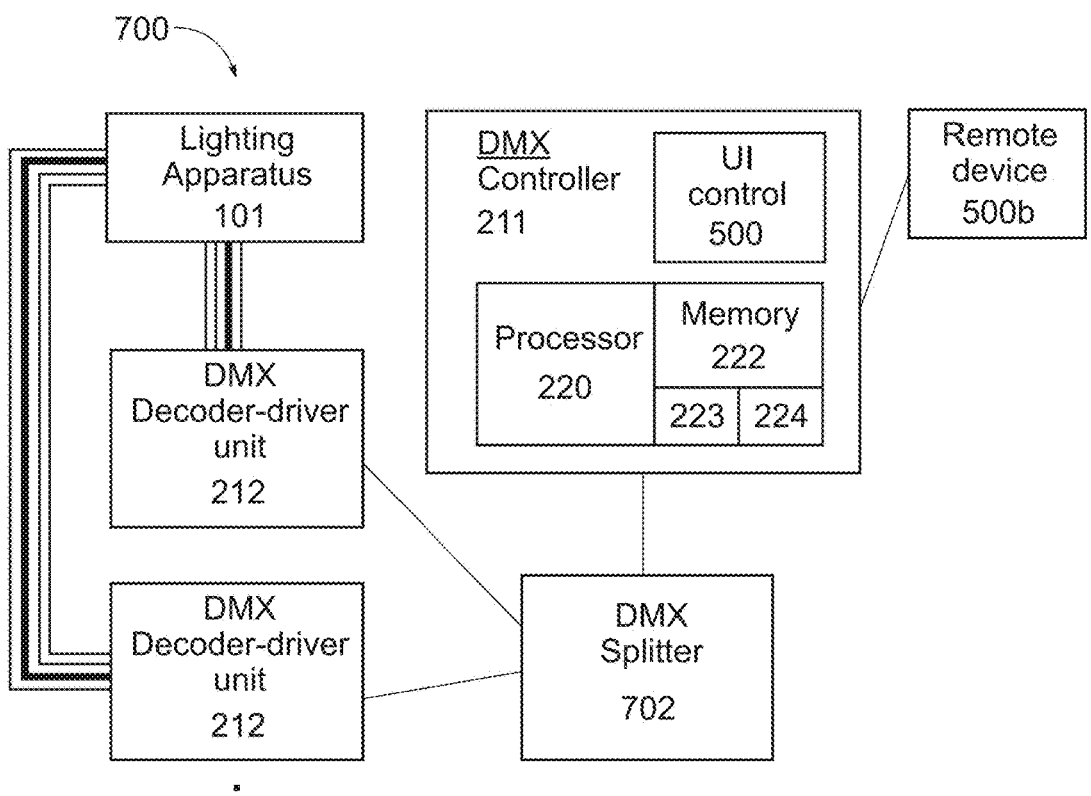
Figure 7E:
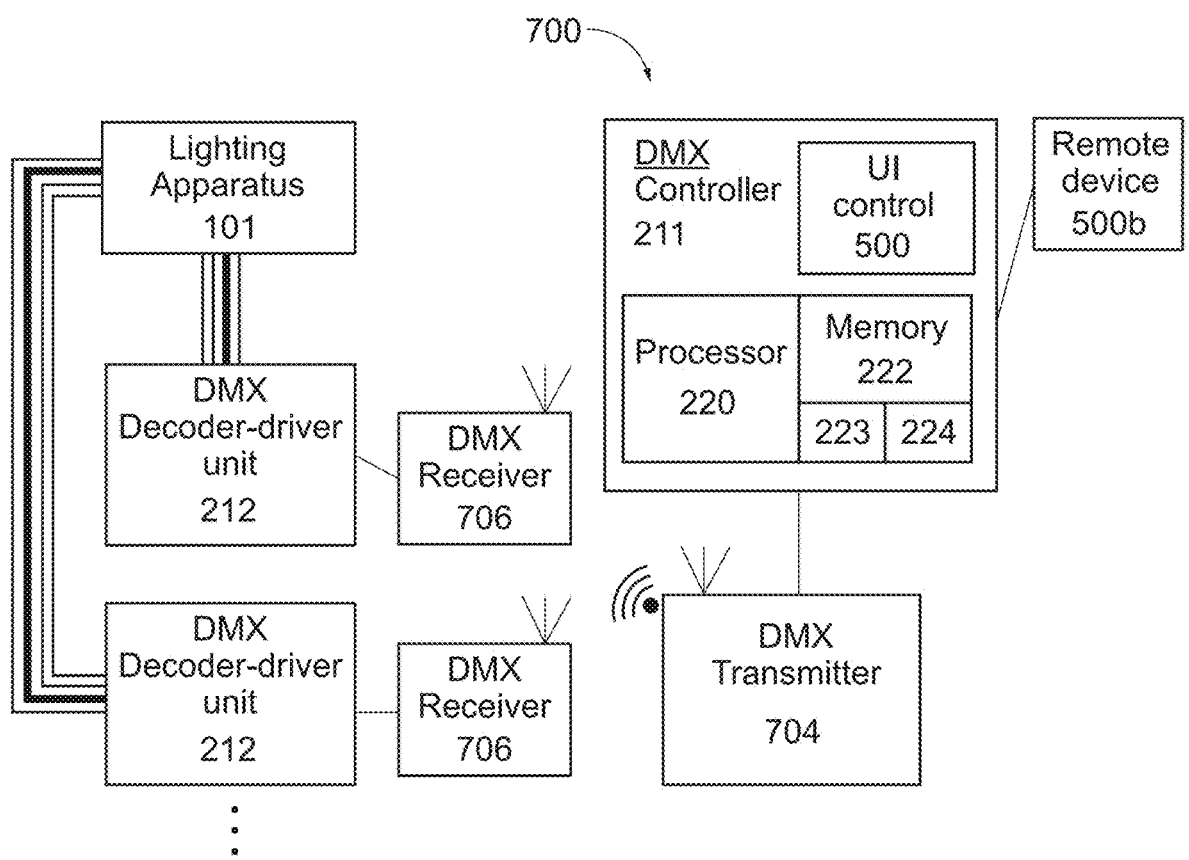

An appropriate DMX decoder-driver unit 212 is also required for each separate section of strip light. For example, if more than 170 RGB colour changing LED fixtures 206 is required, then a second section of strip light 205 will be necessary for the surplus number of LED fixtures 206 (up to an additional 170 RGB colour changing LED fixtures 206). Therefore two three-channel DMX decoder-driver units 212, one for each section of strip light 205 will be required. Similarly, in embodiments where multiple strip lights 205 are configured in parallel (side-by-side), an appropriate DMX decoder-driver unit 212 will be required for each one. As shown in FIGS. 7c-7e respectively, if multiple DMX decoder-driver units 212 are required, they may be connected together in a daisy-chain manner, a DMX splitter 702 may be used, or a DMX wireless transmitter 704 and receivers 706 may be used.

Programmable Control

The control system 700 may be programmed so that sequences of controlled lighting effects of the types mentioned above (and in more detail below) may be played back in the future. Firstly, in cases when DMX control is used, a user assigns DMX addresses (channels) to the DMX decoder-driver units 212. For example, when using a strip light 205 comprising RGB colour changing LED fixtures 206, a first decoder (driver) unit 212 should be assigned with addresses 1-3. If a second strip light 205 is used, then a second DMX decoder-driver unit 212 should be assigned with addresses 4-6, and so on.

In embodiments programmable instruction code 224 may be stored by memory store 222 of the controller 211 (or DMX controller 211, in cases when DMX control is used). The processor 200 may be configured to read, write, input, load and/or save the instruction code 224 to or from the memory store 222, for example when a user inputs a command via the user interface control 500 and/or the remote device 500b. One or both of the controller 211 (or DMX controller 211) and the remote device 500b may store a dedicated software program that enables the user to program a lighting effects sequence. Sequences may also be automatically generated by computer, either in whole or in part e.g. the sequence may be generated according to an algorithm and/or by machine learning techniques (AI), etc.

If both the control system 700 and lighting apparatus 101 are powered when the user enters programming instructions, the strip light 205 may be configured to emit light according to the most recently entered instruction, so that the user can see a real-time preview of the lighting effect sequence as they are programming it.

The memory store 222 has a capacity to store a number of different sequences. The number of sequences that can be stored will depend on the capacity of the memory 222 and the size of each stored sequence.

When the lighting apparatus 101 plays back a stored sequence (or an auto-generated sequence), the controller 211 reads the stored instruction code which the controller 211 (or DMX controller 211) converts in real-time into a series of control signals. These control signals are then delivered to the strip light 205 PCB (via a DMX decoder-driver unit 212, when DMX control is used, so that the LED fixtures 206 are individually addressed and controlled).

A user may interact with the user interface 500 or remote device 500b to control the playback. For example the user may select any of the following control options: pause, resume, speed up the forward play speed, slow down the forward play speed, reverse the sequence (play backwards), speed up the reverse play speed, slow down the reverse play speed, skip back, skip forwards through parts of the sequence, and jump to any defined point in time in the sequence. The user may also override a playback sequence at any time and manually control a lighting effect on the fly instead.

1. Brightness/Dimmer Control In example embodiments, the control system 700 is configured to control the electrical voltage and current levels supplied to one or more of the plurality of LED fixtures 206 the strip light 205. The electrical current level supplied to the LED fixtures 206 is proportional to the controlled voltage level. The voltage level supplied to the LED fixtures 206 may be varied between ground (i.e. 0V DC—LED is "off") and a maximum level (e.g. 12V DC). At 12V DC, the luminosity or brightness of the controlled LED fixtures 206 will be at a maximum, typically around 900 lumens. When the average voltage level for an LED fixture 206 is decreased, the luminosity of that LED fixture 206 is correspondingly decreased. Therefore the controller 211 and/or DMX decoder-driver unit 212 may be effective as a dimmer switch. The controller 211 and/or DMX decoder-driver unit 212 may comprise any suitable means for controlling the average voltage level of the LED fixtures 206, for example a semiconductor device such as a thyristor or triac. Therefore the level of brightness of any one or more of the LED fixtures 206 may be controlled to be set, increased or decreased to emit a desired intensity of light into the scene to be captured by the imaging device 108.

2. Colour Control

In one example embodiment, the control system 700 is configured to send control signals to drive one or more of the LED fixtures 206 so that they emit light with one or more desired colour characteristics. The term "colour characteristics" as used herein may refer to any one or more of hue, chroma (also referred to as intensity or saturation), and value (also referred to luminance, lightness or darkness). Setting or adjusting the colour characteristics may be implemented in a number of different ways. Preferably, and as described above, a strip light 205 is populated with a series of RGB colour changing LEDs. Each of the LED fixtures 206 can be individually controlled by the DMX controller 211 and DMX decoder-driver unit 212 to emit light of almost any colour. Such RGB LEDs can combine the RGB light colours to emit any of over 16 million hues of light (including white light by combining equal amounts of RGB light).

Alternatively, in embodiments where multiple different, single-colour, strip lights 205 are positioned in parallel (side-by-side), the DMX controller 211 and respective DMX decoder-driver units 212 may be configured to cause the different strip lights 205 to emit different levels of light intensity, ranging from minimum (zero) to maximum output light intensity. For example, three individual strip lights 205 each populated with Red, Green and Blue LEDs, respectively, may be independently controlled by DMX controller 211 and three respective DMX decoder-driver units 212, so that the emitted light is mixed to achieve substantially any desired colour (including white light if equal levels of Red, Green and Blue light are present).

Therefore a scene to be captured by the imaging device 108 may be filled with light of a desired colour temperature. For example, a warm colour temperature may be achieved by the control system 700 causing the LEDs to emit more red and yellow light (yellow light being a mix of red and green light). Conversely a cooler colour temperature may be achieved by the control system causing the LEDs to emit more blue light.

In embodiments, the controller 211 alone may be configured to control the strip light 205 to emit light of the same colour along the full length of the strip light 205. Therefore in this example, when the lighting apparatus 101 is attached to the imaging device 108, the same colour or hue of light is radiated outwards in all directions into the scene to be captured by the imaging device 108.

Figure 8A:
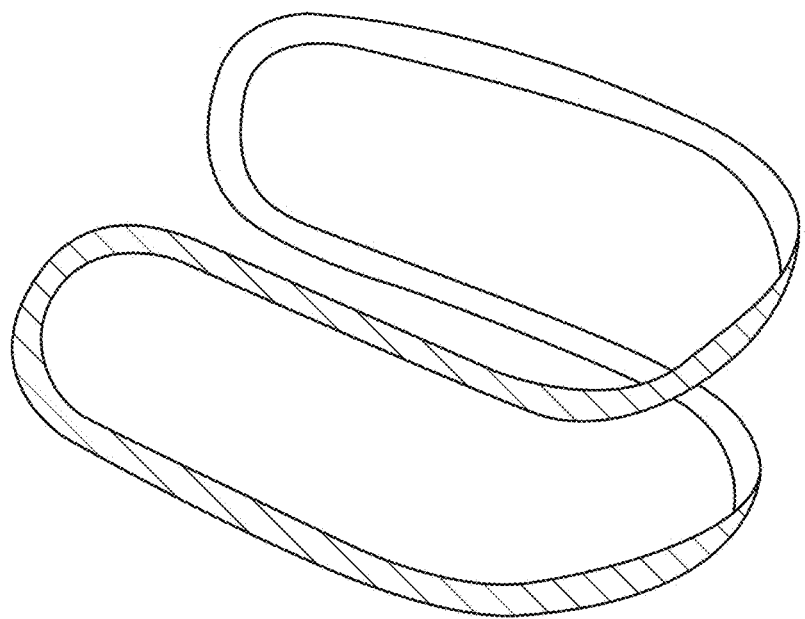
FIGS. 8a and 8b shows an example embodiment of a colour characteristic lighting effect.
Figure 8B:
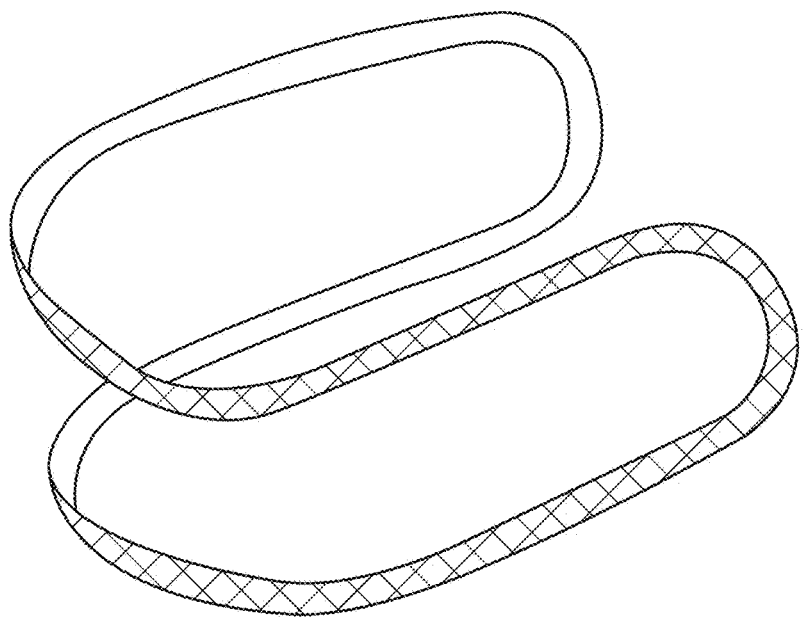

In other embodiments, a DMX controller 211 and DMX decoder-driver unit 212 may be configured to control the strip light 205 to emit light of two or more different colours along a plurality of different portions of the length of the strip. For example as shown in FIGS. 8a and 8b, the strip light 205 comprises a series of colour-changing LEDs, where approximately half of the LEDs are configured to emit light of a first colour or hue (e.g. red light, as indicated by line-hatching in FIG. 8a), and the other half is configured to emit light of a second, different colour or hue (e.g. blue light, indicated by cross-hatching in FIG. 8b).

In further embodiments, the strip light 205 may be controlled in more dynamic ways. For example the strip light 205 may be controlled so that the colour characteristics for each individual LED fixture 206 gradually differs in colour relative to a preceding and following LED fixture 206 on the strip light 205. Therefore the strip light 205 will appear to blend two or more colours in a gradual manner to achieve a gradient effect. The level of gradation between two colours of light is itself controllable using the DMX controller 211 and DMX decoder-driver unit 212. For example, the gradation level may be minimal (very coarse) so that the two colours are not blended at all from one LED fixture 206 to the next on the strip light 205, and incrementally increased through to maximum (very fine) so that the two colours gradually blend from a first colour to a second colour over a number of individual LED fixtures 206. When the gradation level is set to maximum, the number of LED fixtures 206 over which the first colour gradually blends into the second colour may be more or fewer than 10, 20, 30, 40 or 50 in number. While the above example describes gradually blending two colours of light together, three, four, five or more unique colours or hues of light may be gradually blended together along the length of the strip light 205. Further, a pattern of blending between two of more different colours may repeat one or more times along the length of the strip light 205.

3. Sequencing Control

In one example embodiment, the control system 700 is configured to send control signals to drive one or more of the LED fixtures 206 so that they emit light at a constant intensity level (steady) or so that they vary over time according to a programmed sequence, as described above. In simple example sequences the controller 211 may be programmed to cause all of the LED fixtures 206 of the strip light 205 to behave in the same way. For example, over a pre-defined period of time the LED fixtures 206 may increase or decrease in intensity and/or the colour characteristics may be changed (as detailed above). The LED fixtures 206 may all be controlled to flash, strobe, and/or pulsate light over time, according to a programmed sequence. For example, the sequence may define a regular pattern, an irregular series, follow a rhythm or follow a randomly generated sequence.

With dynamic DMX control, the programmed sequences may be made more complex. For example, if certain LED fixtures 206 are sequenced to be switched on and off, or changed colour, the strip light 205 may appear to emit light that "moves" along the length of the strip light. For instance taking the elliptical semi-circular shaped lighting apparatus described above, lighting effects could be sequenced so that it appears that light shifts from one side of the lighting apparatus 101 to the other e.g. from left to right. This illusion of movement may be advantageous when the lighting apparatus 101 needs to redirect fill lighting from one area in a scene to another. The re-direction of the light may be performed smoothly according to the programmed sequence which causes the control system 700 to drive certain LED fixtures 206 and dim other ones over a defined time period e.g. five seconds.

There are many possibilities for such sequenced lighting effects. For example the fill lighting may simulate a sunset by sequencing the LED fixtures 206 to emit a warm yellow light that over time gradually transitions into deeper orange and red tones. As another example, the fill lighting may simulate light from headlights of a passing automobile at night by sequencing the LED fixtures 206 to briefly emit flashes of white light from across one side of the elliptically shaped lighting apparatus 101 to the other side. Further to this example, the LED fixtures 206 could emit a similarly-sequenced red light immediately after the white light sequence, in order to simulate the tail lights of the passing vehicle.

Segments

Figure 9A:
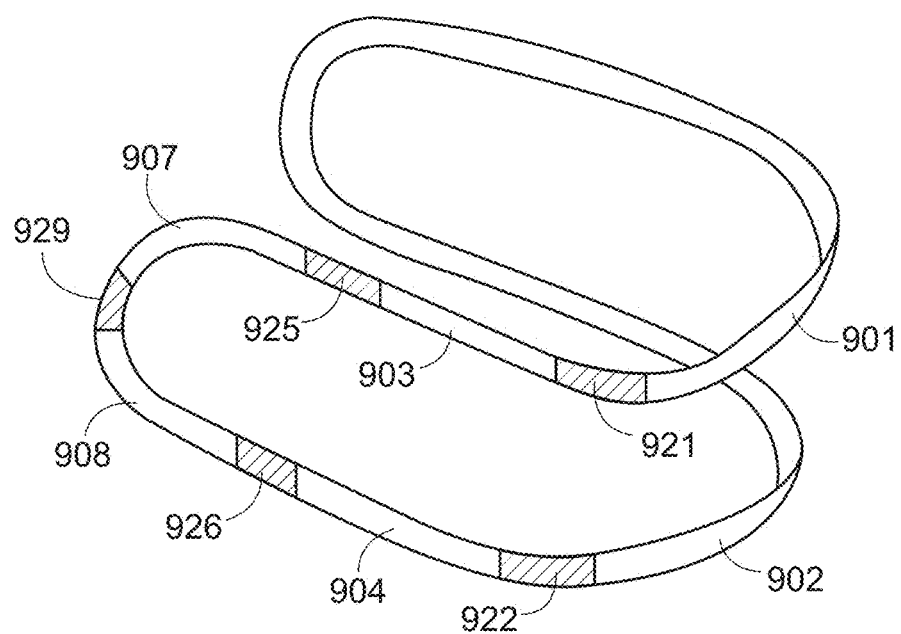
FIGS. 9a-9c show example embodiments of how the lighting apparatus may be controlled in discrete segments.
Figure 9B:
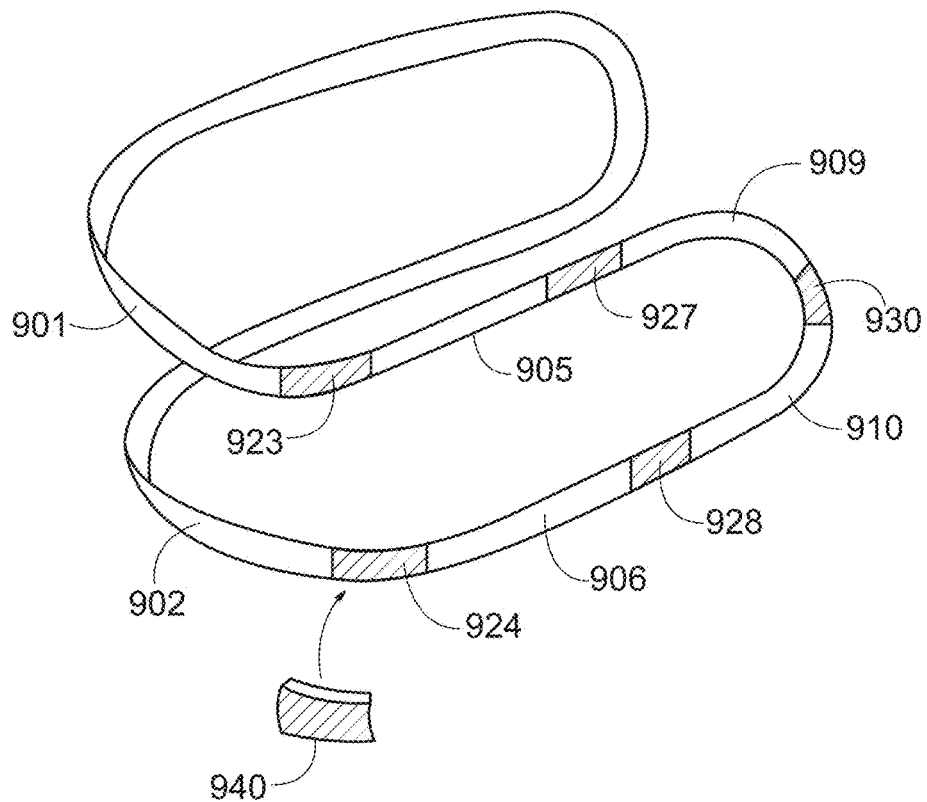

In embodiments, rather than controlling all of the individual LED fixtures 206 that populate a strip light 205 in a particular way, the LED fixtures 206 may be controllable across separate, discrete segments 900 of the LED fixtures 206. With reference to FIGS. 9*a* and 9*b*, the example of the elliptical semi-circular shaped lighting apparatus 101 is shown from life and right side perspectives. The LED fixtures 206, which populate the strip light 205 that runs substantially along the length of the lighting apparatus 101, are notionally divided into a number of discrete segments 900 e.g. ten segments 901, 902, 903, 904, 905, 906, 907, 908, 909 and 910. These discrete segments 900 may be notionally labelled according to their position relative to the imaging device 108, for when the lighting apparatus 101 is attached to the imaging device 108. For example, the ten segments 900 may be respectively referred to as: upper-front-centre 901, lower-front-centre 902, upper-left side 903, lower-left side 904, upper right side 905, lower-right side 906, upper-left-rear 907, lower-left-rear 908, upper-right-rear 909, and lower-right-rear 910.

It should be understood these segments 900 are merely one illustrative example for how the lighting apparatus 101 may be configured. Other ways of segmenting the LED fixtures 206 will be apparent to those skilled in the art. For example, there may be more or fewer than ten segments 900. Further, each segment 900 may or may not be substantially equal in size (or number of LED fixtures 206).

The segmentation may be implemented in a number of ways. In the example of FIGS. 9*a* and 9*b*, a series of one or more LED fixtures 206 located between neighbouring segments may be controlled to output no light, so that a user may more clearly identify the discrete segments 900. Alternatively, the strip light 205 may have regions 921, 922, 923, 924, 925, 926, 927, 928, 929, 930 located between neighbouring segments 900 which are not populated with any LED fixtures 206 so that the discrete segments of LED fixtures 206 are formed directly on the strip light 205 itself. Alternatively, or in addition, opaque portions 207 which align with regions 921, 922, 923, 924, 925, 926, 927, 928, 929, 930 may be incorporated into the design of the structure 202 to further help define the segments 900 more clearly.

Further, one or more light blocking elements 940 may optionally be used to further help define the segments 900 more clearly. The light blocking elements 940 may be opaque accessory elements configured to be removably attachable to the external surface of the structure 202 and aligned with regions 921, 922, 923, 924, 925, 926, 927, 928, 929, 930. The one or more light blocking elements 940 may be made from any suitable opaque material so that it acts to filter the light emitted from the strip light 205 and therefore more clearly define the discrete segments 900.

As described above, the control system 700 (DMX controller 211 and DMX decoder-driver unit 212) enables up to 170 RGB colour changing LED fixtures 206 to be individually controlled. Therefore the control system 700 is capable of controlling the LED fixtures 206 within each of the respective segments 900 individually. That is, for each respective segment 900, the LED fixtures 206 comprised within a respective segment 900 may be controlled in any of the ways already described above. Any two or more of the respective segments 900 may be controlled to emit light in the same way as each other. Any one or more of the respective segments 900 may be controlled to be "off" so that no light is output from those segments 900.

Figure 9C:
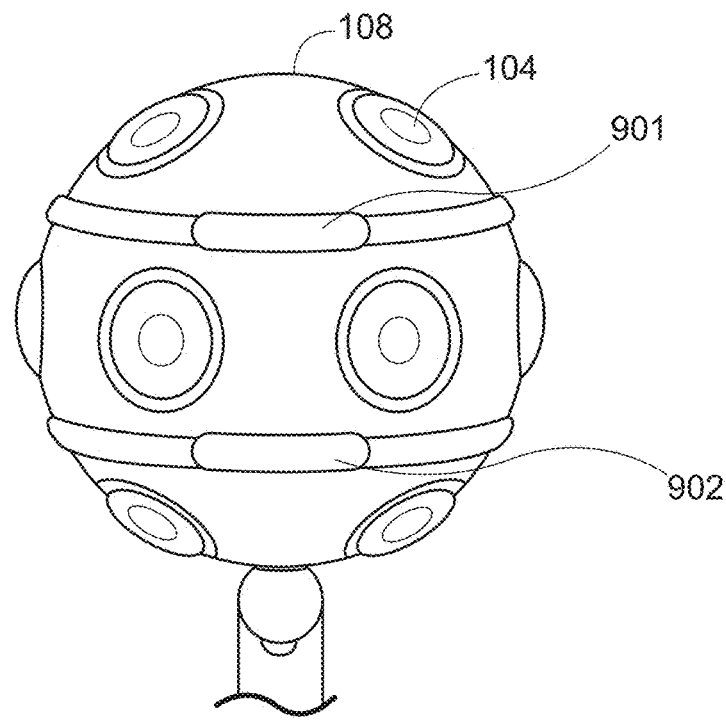

By having these multiple, controllable segments 900, fill lighting effects may be more precisely controlled so that light is directed only to where it is required in a scene. As one example shown in FIG. 9*c*, if fill lighting is only required directly in front of the imaging device 108, then a user may cause the control system 700 to control the strip light 205 so that only LED fixtures 206 in segments 901 and 902 emit any light. Consequently, the control system 700 also controls the strip light 205 by reducing the supply voltage to the LED fixtures 206 in the other segments so that they are held in a low power state (off) and emit no light.

It should be understood that this is merely one example of how the segments 900 may be controlled by the controller 211. A user may cause the control system 700 to control the strip light 205 so that any combination of one or more segments 900 are controlled to emit a desired, respective fill lighting effect.

Further, at times when no fill lighting is required, a user causes the control system 700 to reduce the supply voltage to 0V DC so that the full length of the strip light 205 is held in a low power state ("off") and emits no light at all.

Referring back to FIGS. 7a to 7e, implementation of a controller 211 or DMX controller 211 may be as controller circuitry. The controller 211 may be implemented in hardware alone, have certain aspects in software including firmware alone or can be a combination of hardware and software (including firmware).

Figure 10:
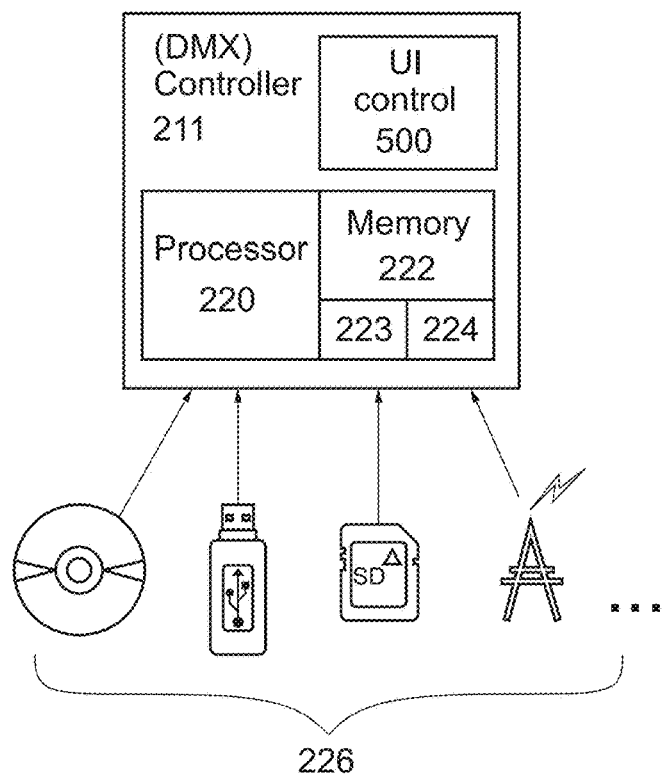
FIG. 10 shows an example embodiment of how a computer program and/or one or more instruction code sequences may arrive at a controller of the control system.

As illustrated in FIG. 10 the controller 211 or DMX controller 211 may be implemented using instructions that enable hardware functionality, for example, by using executable instructions of a computer program 223 in a general-purpose or special-purpose processor 220 that may be stored on a computer readable storage medium (disk, memory, etc.) to be executed by such a processor 220.

The processor 220 is configured to read from and write to the memory 222. The processor 220 may also comprise an output interface via which data and/or commands are output by the processor 220 and an input interface via which data and/or commands are input to the processor 220.

The memory 222 stores a computer program 223 comprising computer program instructions (computer program code) that controls the operation of the lighting apparatus 101 when loaded into the processor 220. The computer program instructions, of the computer program 223, provide the logic and routines that enables the apparatus to function. The memory may further store one or more instruction code sequences 224 that enables the apparatus 101 to perform any of the controlled lighting effects as described above. The processor 220 by reading the memory 222 is able to load and execute the computer program 223 and, if present, the one or more instruction code sequences 224.

As illustrated in FIG. 10, the computer program 223 and/or one or more instruction code sequences 224 may arrive at the controller 211 (or DMX controller 211) via any suitable delivery mechanism 226. The delivery mechanism 226 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 223 and/or one or more instruction code sequences 224. The delivery mechanism may be a signal configured to reliably transfer the computer program 224. The lighting apparatus 101 may propagate or transmit the computer program 223 and/or one or more instruction code sequences 224 as a computer data signal.

Although the memory 222 is illustrated as a single component/circuitry it may be implemented as one or more separate components/circuitry some or all of which may be integrated/removable and/or may provide permanent/semi-permanent/dynamic/cached storage.

Although the processor 220 is illustrated as a single component/circuitry it may be implemented as one or more separate components/circuitry some or all of which may be integrated/removable. The processor 220 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The interconnection of features in a figure does not necessarily mean that the features are connected or directly connected. They may be operationally coupled and any number or combination of intervening elements can exist (including no intervening elements)

Where a structural feature has been described, it may be replaced by means for performing one or more of the functions of the structural feature whether that function or those functions are explicitly or implicitly described.

For example, the lighting apparatus 101 comprises means for selectively emitting light into the environment that surrounds the imaging device.

As used here 'module' refers to a unit or apparatus that excludes certain parts/components that would be added by an end manufacturer or a user. The lighting apparatus 101, the controller 211 (DMX controller 211), the DMX decoder-driver units 212, the user interface control 500 and/or the remote device 500b may be modules.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The lighting apparatus 101 described herein may be located on an imaging device 108 so that it does not occlude, limit or otherwise appear in the field of view being captured by the imaging device. Because the lighting apparatus 101 is located on the imaging device 108 in this way, the imaging device operator and/or other members of a production crew do not have to worry about where to place lighting equipment in a scene so that it does not appear in the captured field of view.

Further, the design of the lighting apparatus 101 advantageously enables a fill light effect to be emitted into a scene but while excess heat energy generated from the light fixtures is drawn away from the imaging device 108 and/or the lighting apparatus so that the performance of the imaging device is not adversely affected.

The invention claimed is:

1. An apparatus comprising a length of strip light populated with a plurality of light fixtures, the apparatus configured to be removably attachable to an external surface of an imaging device,
    wherein, when the apparatus is attached to the imaging device:
        the apparatus surrounds the imaging device but does not occlude one or more cameras of the imaging device that are located about the imaging device, such that the apparatus and light emitted by the strip light do not obscure or distort a respective field of view of the one or more cameras;
        the plurality of light fixtures of the strip light are controllable to selectively emit light into the environment that surrounds the imaging device; and
        the plurality of light fixtures are individually addressable and controllable to set or adjust one or more attributes of the light emitted by the strip light based at least in part upon an output from a control system, said control system comprising a decoder-driver unit in communication with a controller, said strip light being configured to be connected to an output of said decoder-driver unit so that the plurality of light fixtures are individually addressable and controllable.

2. The apparatus of claim 1, wherein the strip light is housed within a flexible structure.

3. The apparatus of claim 2, wherein the structure is reversibly deformable in response to the application of a stress force.

4. The apparatus of claim 2 wherein the apparatus further comprises a backing surface, and
    wherein when the apparatus is attached to the imaging device, at least part of the backing surface is configured to grip an external surface of the imaging device.

5. The apparatus of claim 4, wherein the backing surface is shaped to support the flexible structure.

6. The apparatus of claim 4, wherein the backing surface is further shaped to have a series of heat sink cooling fins configured to draw excess heat away from one or both of the apparatus and the imaging device.

7. The apparatus of claim 4, wherein the backing surface is made of metal, preferably aluminum.

8. The apparatus of claim 2, wherein the flexible structure is a flexible tube structure.

9. The apparatus of claim 8, wherein one or more portions of the flexible tube structure are transparent.

10. The apparatus of claim 8, wherein one or more portions of the flexible tube structure are opaque.

11. The apparatus of claim 8, wherein one or more portions of the flexible tube structure comprise a reflective material lining configured to direct one or more of light and excess heat away from the apparatus.

12. The apparatus of claim 8, further comprising one or more opaque light blocking elements configured to be removably attachable to a respective one or more portions of an external surface of the flexible tube structure,
    wherein, when attached to the external surface of the flexible tube structure, the one or more light blocking elements are configured to block light from being emitted via the respective one or more portions of the external surface of the flexible tube structure.

13. The apparatus of claim 1, wherein the strip light is a flexible LED strip light comprising a plurality of LED light fixtures.

14. The apparatus of claim 13, wherein the plurality of LED light fixtures comprises one or more color changing LEDs.

15. The apparatus of claim 1, wherein the one or more attributes of the light emitted by the strip light comprise any one or more of:
    luminance; and
    one or more color characteristics.

16. The apparatus of claim 1, wherein the control system comprises a Digital Multiplex (DMX) controller and a DMX decoder-driver unit configured to communicate with the DMX controller; wherein the strip light is connected to an output of the DMX decoder-driver unit so that the plurality of light fixtures are individually addressable and controllable to set or adjust the one or more attributes of the light emitted by the strip light.

17. The apparatus claim 16, wherein the light fixtures of the strip light are controllable according to two or more discrete segments of the light fixtures.

18. The apparatus of claim 1, wherein the plurality of light fixtures of the strip light are controllable by the control module over a period of time, to set or adjust the one or more attributes of the light emitted by the strip light according to one or more of:
   a user-defined pre-programmed sequence, and
   a computer generated sequence.

19. The apparatus of claim 1, wherein the apparatus is configured to be removably attachable to an imaging device that is capable of 360 degree image capture.

20. An apparatus comprising:
   a length of strip light configured to be housed within a flexible tube structure, the length of strip light populated with a plurality of light fixtures, the apparatus configured to be removably attachable to an external surface of an imaging device; and
   one or more opaque light blocking elements configured to be removably attachable to a respective one or more portions of an external surface of the flexible tube structure,
   wherein, when the apparatus is attached to the imaging device:
      the apparatus surrounds the imaging device but does not occlude one or more cameras of the imaging device that are located about the imaging device, such that the apparatus and light emitted by the strip light do not obscure or distort a respective field of view of the one or more cameras;
      the plurality of light fixtures of the strip light are controllable to selectively emit light into the environment that surrounds the imaging device; and
      the one or more light blocking elements are configured, when attached to the external surface of the flexible tube structure, to block light from being emitted via the respective one or more portions of the external surface of the flexible tube structure.

\* \* \* \* \*